(12) United States Patent
Alaze

(10) Patent No.: US 8,925,897 B2
(45) Date of Patent: Jan. 6, 2015

(54) SOLENOID VALVE AND DRIVER ASSISTANCE DEVICE

(75) Inventor: Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 794 days.

(21) Appl. No.: 13/182,402

(22) Filed: Jul. 13, 2011

(65) Prior Publication Data

US 2012/0012765 A1 Jan. 19, 2012

(30) Foreign Application Priority Data

Jul. 14, 2010 (DE) .......................... 10 2010 031 328

(51) Int. Cl.
*F16K 31/08* (2006.01)
*H01F 7/127* (2006.01)
*B60T 8/36* (2006.01)
*F16K 31/06* (2006.01)

(52) U.S. Cl.
CPC ................ *H01F 7/127* (2013.01); *B60T 8/363* (2013.01); *F16K 31/0648* (2013.01); *F16K 31/0689* (2013.01)
USPC ................... 251/129.19; 303/119.2; 335/279; 335/281

(58) Field of Classification Search
USPC .......... 251/129.15, 129.19; 303/119.1–119.2; 335/257, 261–262, 279, 281
See application file for complete search history.

(56) References Cited

U.S. PATENT DOCUMENTS

| | | | | |
|---|---|---|---|---|
| 2,407,963 | A | * | 9/1946 | Persons ......................... 335/261 |
| 3,324,889 | A | * | 6/1967 | Batts ........................ 137/625.69 |
| 4,530,373 | A | * | 7/1985 | Bork et al. .................... 251/360 |
| 4,546,955 | A | * | 10/1985 | Beyer et al. .............. 251/129.15 |
| 4,604,600 | A | * | 8/1986 | Clark ........................... 335/261 |
| 4,783,051 | A | * | 11/1988 | Gibas ....................... 251/129.19 |
| 5,167,442 | A | * | 12/1992 | Alaze et al. ................ 303/113.2 |
| 5,423,602 | A | * | 6/1995 | Takahashi .................. 303/119.2 |
| 5,467,961 | A | * | 11/1995 | Sausner et al. ................ 335/257 |
| 5,553,829 | A | * | 9/1996 | Hemsen .................. 251/129.21 |
| 5,565,832 | A | * | 10/1996 | Haller et al. .................. 335/262 |
| 5,626,327 | A | * | 5/1997 | Clark ........................ 251/129.15 |
| 5,992,822 | A | | 11/1999 | Nakao et al. |
| 6,065,495 | A | * | 5/2000 | Fong et al. ............... 137/625.25 |
| 6,268,784 | B1 | * | 7/2001 | Feigel et al. .................. 335/261 |
| 6,877,717 | B2 | * | 4/2005 | Collins et al. ............ 251/129.15 |
| 7,051,993 | B2 | * | 5/2006 | Kim et al. ................ 251/129.15 |
| 7,422,193 | B2 | * | 9/2008 | Sisk et al. ........................ 251/64 |
| 2011/0062363 | A1 | * | 3/2011 | Weiss et al. .............. 251/129.15 |
| 2011/0147625 | A1 | * | 6/2011 | Speer ....................... 251/129.15 |

* cited by examiner

*Primary Examiner* — John Bastianelli
(74) *Attorney, Agent, or Firm* — Maginot, Moore & Beck LLP

(57) ABSTRACT

A solenoid valve includes a magnet armature, which is operatively connected to a sealing element of the solenoid valve in order to move the latter, and an armature opposing piece which is arranged at the end of the magnet armature. An intermediate element, which can be placed in supporting contact with the armature opposing piece, is mounted in an axially movable fashion in a guide recess in the magnet armature. A driver assistant device includes the above-described solenoid valve.

9 Claims, 1 Drawing Sheet

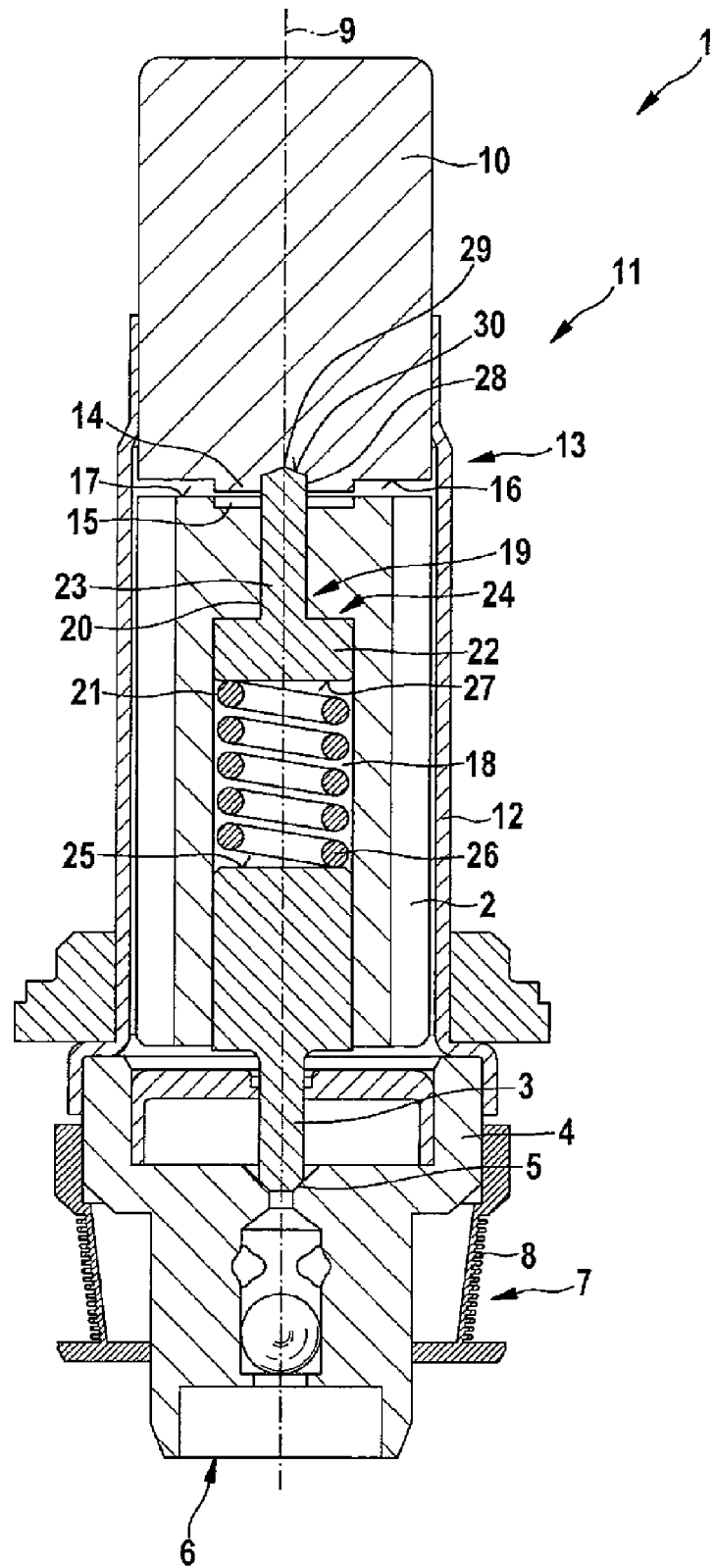

SOLENOID VALVE AND DRIVER ASSISTANCE DEVICE

This application claims priority under 35 U.S.C. §119 to German patent application no. DE 10 2010 031 328.9, filed Jul. 14, 2010 in Germany, the disclosure of which is incorporated herein by reference in its entirety.

BACKGROUND

The disclosure relates to a solenoid valve having a magnet armature, which is operatively connected to a sealing element of the solenoid valve in order to move the latter, and having an armature opposing piece which is arranged at the end of the magnet armature.

Solenoid valves of the type mentioned at the beginning are known from the prior art. They are usually used for driver assistant devices, in particular ABS, TCS or ESP devices. The solenoid valve has the magnet armature which is arranged so as to be movable, in particular axially, in the solenoid valve. The magnet armature is operatively connected to the sealing element of the solenoid valve with the result that when the magnet armature moves, the sealing element is also moved. The sealing element is usually provided for closing or clearing a valve opening of the solenoid valve. If the sealing element is arranged with the purpose of closing the valve opening, it is usually seated in a valve seat of the solenoid valve, which valve seat is assigned both to the valve opening and to the sealing element. For example, the sealing element is inserted into a recess in the magnet armature and held therein, wherein the recess is preferably provided on an end side, facing away from the armature opposing piece, of the magnet armature.

In addition to the magnet armature, the solenoid valve also has the armature opposing piece which is embodied, for example, as a pole core. The pole core is usually held in a positionally fixed fashion with respect to a housing of the solenoid valve, while the magnet armature can be moved with respect to the housing. In order to bring about this movement, the magnet armature and the armature opposing piece interact. In this context, the armature opposing piece has, for example, one or more coils, while the magnet armature is composed of a magnetizable or magnetic material. The armature opposing piece is provided at the end of the magnet armature. The magnet armature and the armature opposing piece are usually arranged with respect to one another in such a way that they cannot enter into connection with one another, irrespective of the movement of the magnet armature. Accordingly, a gap, referred to as the air gap or the working air gap, is present between the magnet armature and the armature opposing piece or between the end side, facing the armature opposing piece, of the magnet armature and the end side, facing the magnet armature, of the armature opposing piece. The size of the air gap is dependent on the position of the magnet armature with respect to the armature opposing piece. The size of the air gap accordingly changes when the magnet armature moves.

The magnet armature and the armature opposing piece together form an actuating device. The magnetic force which can be generated by this actuating device, and which is implemented by the movement of the magnet armature, is characterized by the size of the working air gap. This means that the magnetic force is dependent on the size of the working air gap, wherein the magnetic force increases very strongly—usually exponentially—when the working air gap becomes smaller. This strong increase in a working air gap which is becoming smaller makes the continuous adjustability or the proportionalization of the solenoid valve more difficult.

It is generally known that the strong increase in the magnetic force can be eliminated or at least reduced by means of what is referred to as a plunger stage. In order to implement the plunger stage, an area of the armature opposing piece engages at least in certain areas in a recess in the magnet armature as soon as the magnet armature undershoots a specific distance from the armature opposing piece. However, the implementation of such a plunger stage in a solenoid valve is costly because very precise guidance of the magnet armature with respect to the armature opposing piece is necessary in order to avoid the magnet armature and armature opposing piece impacting against one another or contacting one another, also in the region of the plunger stage. Such impacting or contact would significantly compromise the efficiency level of the actuating device which is composed of the magnet armature and armature opposing element.

Precise guidance can be formed, for example, by precise fitting of the magnet armature into a magnet armature guide, for example of a housing of the solenoid valve. On the other hand, the magnet armature must, however, also be capable of being moved as easily as possible, that is to say without a large application of force. Therefore, very small tolerances have to be implemented during the manufacture of the solenoid valve in order, on the one hand, to make the plunger stage possible and, on the other hand, to permit easy movement of the solenoid valve. However, this results in high manufacturing costs.

SUMMARY

In contrast, the solenoid valve having the features mentioned in claim 1 has the advantage that very precise guidance of the magnet armature with respect to the armature opposing piece, in particular together with low manufacturing costs, can be implemented. This is achieved according to the disclosure in that an intermediate element which can be placed in supporting contact with the armature opposing piece is mounted in an axially movable fashion in a guide recess in the magnet armature. For this purpose, the guide recess or recess which forms the guide recess is present, preferably with an open edge, on the end side, facing the armature opposing piece, of the magnet armature. Given a corresponding position with respect to the armature opposing piece, the magnet armature is supported on said armature opposing piece via the intermediate element, with the result that very precise positioning of the magnet armature with respect to the armature opposing piece can be achieved. In particular, in this way it is possible to at least partially prevent tilting of the magnet armature with respect to the armature opposing piece. The term supporting contact is to be understood here as meaning that the intermediate element is supported by contact on the armature opposing piece or an element assigned to the armature opposing piece. In other words, the intermediate element is in supporting contact, or contact, with the armature opposing piece or with the element assigned to the armature opposing piece, in at least one position, in particular an axial position, of the movable magnet armature. Continuous presence of this supporting contact is preferred. It is possible to provide here, for example, that the intermediate element engages in a recess in the armature opposing piece. The intermediate element is preferably composed of a non-magnetizable or non-magnetic material. A spring force can be applied to the intermediate element by a spring element, said spring force preferably pushing the intermediate element in the direction of the armature opposing piece.

One development of the disclosure provides that the intermediate element engages, at least in certain areas, in the armature opposing piece or a supporting element which is assigned to the armature opposing piece, or rests on the armature opposing piece or the supporting element. The armature opposing piece or the supporting element therefore has at least one receptacle opening for the intermediate element. The receptacle opening is preferably provided on the end side of the armature opposing piece facing the intermediate element. In at least one position of the magnet armature with respect to the armature opposing piece, at least one area of the intermediate element engages in the receptacle opening. In this context, the receptacle opening is preferably matched, in terms of its dimensions, to the intermediate element and has, in particular, a cross section which is embodied in an inverse fashion with respect to the cross section of the intermediate element. This means that the receptacle opening is matched to the intermediate element in such a way that the area of the intermediate element which engages in the receptacle opening is accommodated in the receptacle opening in such a way or is surrounded by walls of the receptacle opening in such a way that it is guided in the receptacle opening in the axial direction of the solenoid valve or in the direction of movement of the magnet armature.

The engagement of the intermediate element in the armature opposing piece or the supporting element therefore preferably causes the intermediate element to be locked in the radial direction with the result that only a movement of the intermediate element in the axial direction is possible. The intermediate element can accordingly be moved further into the receptacle opening or pass further out of it again. In this context, the dimensions of the receptacle opening are preferably selected such that although the radial guidance of the intermediate element is ensured, the movement of the intermediate element in the axial direction is not opposed with an unnecessarily large frictional resistance. Alternatively, it is also possible to provide that the intermediate element rests only on the armature opposing piece or on the supporting element and the supporting contact is produced in this way. In such an embodiment, at least tilting of the intermediate element and therefore of the magnet armature with respect to the armature opposing piece can be prevented.

It is additionally or alternatively possible to provide that the supporting element engages at least in certain areas in the armature opposing element. In this way, the supporting element can be attached to the armature opposing element. In particular, there may be provision for the solenoid valve to be adjusted by virtue of the fact that the supporting element engages in a clamping fashion in the armature opposing element, wherein the clamping force is of such a large size that given a normal operation of the solenoid valve no movement of the supporting element with respect to the armature opposing element is to be expected. Accordingly, the supporting element can be introduced into the armature opposing element or moved out of the latter only during the adjustment of the solenoid valve under the influence of an external force. The solenoid valve can therefore be adjusted by introducing the supporting element into the armature opposing element to differing degrees in such a way.

One development of the disclosure provides that the intermediate element has, on its side facing the armature opposing piece, a cross section which decreases in the direction of the armature opposing piece, and that said intermediate element is, in particular, conical or spherical. The intermediate element accordingly has a centering device, in particular for centering with respect to the armature opposing piece. In this context, the armature opposing piece preferably has the receptacle opening which has a cross section which is inverse with respect to the cross section of the intermediate element. The receptacle opening in the armature opposing piece is accordingly matched to the shape of the side of the intermediate element facing the armature opposing piece. In this way, the intermediate element is guided into the receptacle opening when the magnet armature approaches the armature opposing piece. The decreasing cross section of the intermediate element therefore brings about, together with the correspondingly configured receptacle opening, centering of the intermediate element with respect to the armature opposing piece and therefore also of the magnet armature with respect to the armature opposing piece.

One development of the disclosure provides that the intermediate element engages through a through-opening which is provided on the side of the magnet armature facing the armature opposing piece, wherein the through-opening forms a radial guide for the intermediate element. In addition to the guide recess, the through-opening in the magnet armature is therefore formed. Both the guide recess and the through-opening are preferably formed by the same recess, which, for this purpose, is present, for example, as a stepped bore in the magnet armature. In order to make available the radial guidance of the intermediate element by the through-opening, a region of the intermediate element which is larger in the axial direction of the intermediate element than in the guide recess is preferably located in said through-opening. The through-opening engages, for example, through the end side of the magnet armature, which end side faces the armature opposing piece. The through-opening is matched to the dimensions of the intermediate element in such a way that the intermediate element can readily move in the axial direction but is securely held in the radial direction. In this way, the magnet armature is positioned or centered in the radial direction with respect to the armature opposing piece as soon as the intermediate element engages in the receptacle opening of the armature opposing piece or of the supporting element.

One development of the disclosure provides that the cross section of the through-opening is small in comparison with the cross section of the guide recess. In this way, an end stop for the intermediate element is formed in the magnet armature, which end stop bounds the movement of said intermediate element in the axial direction. For this purpose, an area of the intermediate element which faces away from the armature opposing piece is larger than the through-opening, with the result that it cannot pass therethrough.

One development of the disclosure provides that the intermediate element is supported, by its side facing away from the armature opposing piece, on a spring element arranged in the guide recess. A spring force can accordingly be applied to the intermediate element by the spring element, which spring force preferably pushes said intermediate element in the direction of the armature opposing piece. The spring element lies here, for example, on a supporting face or a securing projection of the intermediate element, which supporting face or securing projection has larger dimensions in the radial direction than the through-opening.

One development of the disclosure provides that the spring element engages around the intermediate element, at least in certain areas and preferably in a clamping fashion. In particular, in order to support the spring element in the radial direction it may be provided that the spring element engages around the intermediate element at least in certain areas. Accordingly, the spring element is present in the radial direction between a wall of the guide recess and the intermediate element. The spring element is preferably embodied as a helical spring here. In addition it is possible to provide that the spring element engages around the intermediate element in a clamping fashion, with the result that the spring force can be applied to the intermediate element by the spring element by means of the clamping engagement.

One development of the disclosure provides that the spring element engages on the intermediate element via a securing projection which is provided on the intermediate element. The intermediate element accordingly has the securing projection which is present, for example, in the radial direction. This is provided, in particular, when the spring element engages, at least in certain areas, around the intermediate element in the radial direction. In this case, the engagement around the intermediate element serves to support the spring element, while the spring force is transmitted to the intermediate element via the securing projection.

One development of the disclosure provides that the magnet armature and the armature opposing element engage one in the other, at least in certain areas, wherein a plunger stage is formed. The plunger stage is present here in a manner which is known per se and it serves to improve the adjustability or the proportionalization of the solenoid valve. The plunger stage prevents here a situation in which the magnetic force between the magnet armature and the armature opposing piece increases too strongly or too quickly when the axial working air gap becomes smaller, that is to say the gap which is present at the end between the magnet armature and the armature opposing piece becomes smaller.

The disclosure also relates to a driver assistant device, in particular ABS, TCS or ESP device, having at least one solenoid valve, in particular according to the statements above, wherein the solenoid valve has a magnet armature which is operatively connected to a sealing element of the solenoid valve in order to move the latter, and an armature opposing piece which is arranged at the end of the magnet armature. There is provision here that, in a guide recess in the magnet armature, an intermediate element which can be placed in supporting contact with the armature opposing piece is mounted in an axially movable fashion. As already stated above, the solenoid valve according to the disclosure can be embodied in a cost-effective fashion, with precise guidance or orientation of the magnet armature with respect to the armature opposing piece still being possible. The driver assistant device according to the disclosure, which has one or more such solenoid valves, can therefore also be manufactured comparatively cost-effectively.

BRIEF DESCRIPTION OF THE DRAWING

The disclosure will now be explained in more detail on the basis of the exemplary embodiments illustrated in the drawing, without the disclosure being restricted thereto. In this context, the single FIGURE shows a lateral sectional view of a solenoid valve.

DETAILED DESCRIPTION

The FIGURE shows a solenoid valve 1 which is, for example, a component of a driver assistant device (not illustrated here). The solenoid valve 1 has a magnet armature 2 which is operatively connected to a sealing element 3 of the solenoid valve 1. The sealing element 3 interacts with a valve seat 5 which is formed in a valve body 4, in order to clear or disconnect a flow connection between an inlet port 6 and an outlet port 7 of the solenoid valve 1. In the exemplary embodiment illustrated here, a filter 8 is assigned to the outlet port 7. Additionally or alternatively it is, of course, also possible to assign a filter (not illustrated here) to the inlet port 6. The solenoid valve 1 illustrated here is configured in accordance with the arrangement of the inlet port 6 and outlet port 7 for axial inflow and radial outflow (with respect to a longitudinal axis 9 of the solenoid valve 1). However, the inflow direction or the outflow direction can, of course, be provided as desired.

In addition to the magnet armature 2, the solenoid valve 1 has an armature opposing piece 10 which forms, together with the magnet armature 2, an activation device 11 of the solenoid valve 1. The armature opposing piece 10 is embodied, for example, as a pole stage and has at least one electrical coil, with the result that a magnetic force can be applied to the magnet armature 2 by means of the armature opposing piece 10 by applying a voltage to the coil (that is to say by energizing the solenoid valve 1). The magnet armature 2 is mounted in an axially displaceable fashion with respect to the longitudinal axis 9, wherein the bearing is implemented, in particular by means of a housing 12 of the solenoid valve 1. In this context, the armature opposing piece 10 and the valve body 4 are also held in a positionally fixed fashion on the housing 12. It is therefore possible for the magnet armature 2 to be moved in the axial direction in relation to the magnet armature 2 or the valve body 4 under the influence of the magnetic force generated by means of the armature opposing piece 10. The solenoid valve 1 which is illustrated in the FIGURE is a solenoid valve 1 which is closed in the non-energized state. This means that the sealing element 3 is inserted in a seal-forming fashion into the valve seat 5 as long as the solenoid valve 1 is not energized, that is to say no magnetic force is generated by means of the armature opposing piece 10.

In order to improve the adjustability of the solenoid valve 1, the latter has a plunger stage 13. This is to be understood as meaning that the magnet armature 2 and the armature opposing piece 10 engage one in the other at least in certain areas. In the exemplary embodiment illustrated here, the armature opposing piece 10 has a plunger stage projection 14 which, given a corresponding axial position of the magnet armature 2, can dip into a plunger stage recess in the magnet armature 2. The plunger stage projection 14 is accordingly provided on an end side 16, facing the magnet armature 2, of the armature opposing piece 10, and the plunger stage recess 15 is provided on an end side 17, facing the armature opposing piece 10, of the magnet armature 2.

However, the plunger stage 13 makes it necessary for the magnet armature 2 to be positioned, or to be capable of being positioned, extremely precisely with respect to the armature opposing piece 10, in particular in the radial direction. For this reason, an intermediate element 19 is arranged in a guide recess 18 of the magnet armature 2. The intermediate element 19 is mounted here in an axially movable fashion and can enter into supporting contact with the armature opposing piece 10. In addition to the guide recess 18, the magnet armature 2 has a through-opening 20, wherein the guide recess 18 and the through-opening 20 are preferably formed by a stepped drill hole 21. The through-opening 20 has a smaller cross section than the guide recess 18, and therefore in particular a smaller diameter. At the same time, the intermediate element 19 is composed of a guide section 22 and a passage section 23. The guide section 22 is arranged in the guide recess 18, while the passage section 23 is present, at least in certain areas, in the through-opening 20. The guide section 23 has here a larger cross section, in particular a larger diameter, than the passage section 23. To this extent, an end stop 24 for the intermediate element 19 is formed in the magnet armature 2. The end stop 24 prevents the intermediate element 19 from being able to move out of the magnet armature 2 or out of the stepped drill hole 21 in the direction of the armature opposing piece 10.

As a result of the small dimensions of the passage section 23 compared to the guide section 22, virtually the entire pole face (in the form of the surface of the end side 17) is available for transmitting the magnetic force or for forming the plunger stage.

On the side of the magnet armature 2 facing away from the intermediate element 19, the sealing element 3 is inserted into the stepped drill hole 21. In this context, the sealing element 3 is preferably pressed into the stepped drill hole 21, with the result that it is held therein in a clamping fashion. The sealing element 3 has, on its side facing away from the valve seat 5, a supporting face 25 for a spring element 26 which is arranged between the sealing element 3 and the intermediate element 19. The intermediate element 19 has here a support face 27 for the spring element 26. Alternatively, the spring element 26 can engage around the intermediate element 19, at least in certain areas in the radial direction, with the result that the spring element 26 is arranged in the radial direction between the intermediate element 19 and the wall of the stepped drill hole 21 or the guide recess 18. In this way, it is possible to bring about axial guidance of the spring element 26.

The spring element 26 gives rise to a spring force which acts on the intermediate element 19, said spring element 26 being supported on the sealing element 3 which is arranged in a positionally fixed fashion with respect to the magnet armature 2. The spring force forces the intermediate element 19 in the direction of the armature opposing piece 10. If the solenoid valve 1 is energized, that is to say the corresponding magnetic force, directed in the direction of the armature opposing piece 10 in the exemplary embodiment illustrated here, acts on the magnet armature 2, then the magnet armature 2 is consequently moved toward the armature opposing piece 10. As soon as the magnet armature 2 has reached an axial position with respect to the armature opposing piece 10 at which the intermediate element 19 is in contact or supporting contact with the armature opposing piece 10, the intermediate element 19 is moved into the guide recess 18, that is to say toward the sealing element 3. In this context, the spring element 26 is tensioned further. If the magnetic force is eliminated, the spring force causes the magnet armature 2 to be pushed away again from the armature opposing piece 10. In the embodiment proposed here, the resetting of the magnet armature 2 is therefore also implemented by means of the intermediate element 19, wherein the intermediate element 19 is constantly in supporting contact with the armature opposing piece 10. However, it is likewise possible to provide that a further spring element (not illustrated here) is used for the resetting. In this case, the intermediate element 19 can be spaced apart from the armature opposing piece 10 in at least one position of the magnet armature 2 and only enter into supporting contact with the armature opposing piece 10 when the magnet armature 2 and the armature opposing piece 10 move toward one another.

In order to permit reliable centering or positioning of the magnet armature 2 with respect to the armature opposing piece 10, the intermediate element 19 engages, in at least one position or axial position of the magnet armature 2, in the armature opposing piece 10. For this purpose, the armature opposing piece 10 has a receiving opening 28. This is preferably located on the end side 16 facing the magnet armature 2. In order to permit reliable positioning of the magnet armature 2 with respect to the armature opposing piece 10, the intermediate element 19 is also constructed with a cross section which decreases in the direction of the armature opposing piece 10 on the side of said intermediate element 19 which faces the armature opposing piece 10. In the exemplary embodiment in question here, the intermediate element 19 has a wedge-shaped tip 29. Alternatively, it is also possible to conceive, for example, of an embodiment in the form of a hemisphere or of a frustum.

The receiving opening 28 is adapted to the geometry of the tip 29 or of the intermediate element 19, with the result that the receiving opening 28 for the exemplary embodiment described here is also conical. An oblique face 30, which serves as a centering face, is therefore present in the receiving opening 28. When the intermediate element 19 or the tip 29 moves into the receiving opening 28, the tip 29 enters into contact with the oblique face 30, irrespective of the radial position of said tip 29, and said tip 29 is therefore reliably centered. Because the intermediate element 19 is also guided in the radial direction in the passage section 23 of the magnet armature 2, the magnet armature 2 is therefore centered with respect to the armature opposing piece 10 as the intermediate element 19 moves into the receiving opening 28. In this context, in principle any desired dimensions of the receiving opening 28 can be selected. The receiving opening 28 can, in particular, have a larger diameter than the region of the intermediate element 19 which is provided for engaging in the receiving opening 28. The diameter of the receiving opening 28 advantageously corresponds, however, to the diameter of the intermediate element 19.

It is, of course, also possible, as illustrated in the FIGURE, for the receiving opening 28 to have a greater depth than the tip 29. In this case, as the tip 29 moves toward the armature opposing piece 10 it impacts against magnet-armature-side edges of the receiving opening 28 if it is not already centered with respect to the armature opposing piece 10. As a result of this occurrence and the further movement of the intermediate element 19 into the armature opposing piece 10, the magnet armature 2 is, as already described above, reliably centered with respect to the armature opposing piece 10. It is therefore possible, in particular, to avoid a configuration of the housing 12 for guiding the magnet armature 2 with small tolerances. Instead, the guidance of the magnet armature 2 is implemented, at least in the region of the plunger stage 13, by means of the intermediate element 12 or the tip 29 thereof. In this way, it is possible, for example, for fabrication-related concentricity errors between the armature opposing piece 10 and the magnet armature 2 to be compensated. If the concentricity errors become too large, the dimensions of the magnet armature 2 can be readily reduced on its side facing the armature opposing piece 10, that is to say the distance between the magnet armature 2 and the housing 12 can be made larger without adversely affecting the guidance of the magnet armature 2.

In the inventive configuration of the solenoid valve 1, the pretensioning of the spring element, which is embodied, for example, as a helical spring, can be adjusted by pressing the sealing element 3 into the magnet armature 2.

What is claimed is:
1. A solenoid valve, comprising:
a sealing element;
a magnet armature operatively connected to the sealing element in order to move the sealing element, the magnet armature defining a guide recess;
an armature opposing piece arranged at an end of the magnet armature and including a first end position defining a receiving recess;
an intermediate element positioned in an axially movable fashion in the guide recess of the magnet armature and extending into and in supporting contact with the receiving recess of the armature opposing piece;

wherein the magnet armature and the armature opposing element engage one in the other, at least in certain areas, wherein a plunger stage is formed; and wherein a plunger stage recess is defined in an end surface of the magnet armature facing the armature opposing piece and a plunger stage projection extends from the first end portion of the armature opposing piece into the plunger stage recess.

2. The solenoid valve according to claim 1, wherein the intermediate element engages the receiving recess in the armature opposing piece.

3. The solenoid valve according to claim 1, wherein a projecting end portion of the intermediate element extending into the receiving recess has a cross section which decreases in a direction of the armature opposing piece, and said projecting end portion is conical or spherical.

4. The solenoid valve according to claim 1, wherein:
a projecting end portion of the intermediate element extends through a through-opening defined in a second end portion of the magnet armature facing the armature opposing piece; and
the through-opening forms a radial guide for the intermediate element.

5. The solenoid valve according to claim 4, wherein the cross section of the through-opening is small in comparison with the cross section of the guide recess.

6. The solenoid valve according to claim 1, further comprising:
a spring element arranged in the guide recess and configured to support the intermediate element on a side of the intermediate element facing away from the armature opposing piece.

7. A driver assistant device comprising:

a sealing element;

at least one solenoid valve including (i) a magnet armature operatively connected to the sealing element in order to move the sealing element, (ii) an armature opposing piece arranged at an end of the magnet armature and having a first end portion defining a receiving recess, and (iii) an intermediate element positioned in an axially movable fashion in a guide recess of the magnet armature and extending into and in supporting contact with the receiving recess of the armature opposing piece;

wherein the magnet armature and the armature opposing element engage one in the other, at least in certain areas, wherein a plunger stage is formed; and wherein a plunger stage recess is defined in an end surface of the magnet armature facing the armature opposing piece and a plunger stage projection extends from the first end portion of the armature opposing piece into the plunger stage recess.

8. The drive assistant device according to claim 7, wherein the driver assistant device is one of an antilock braking system, a traction control system, and an electronic stability program device.

9. The solenoid valve according to claim 2, wherein a projecting end portion of the intermediate element fits in a complementary manner into the receiving recess of the armature opposing piece.

\* \* \* \* \*

UNITED STATES PATENT AND TRADEMARK OFFICE
CERTIFICATE OF CORRECTION

PATENT NO. : 8,925,897 B2
APPLICATION NO. : 13/182402
DATED : January 6, 2015
INVENTOR(S) : Norbert Alaze Page 1 of 1

It is certified that error appears in the above-identified patent and that said Letters Patent is hereby corrected as shown below:

In the claims

Column 8, in claim 1, line 61, delete the word "position" between the words "end" and "defining" and insert the word --portion-- in its place.

Column 10, in claim 8, line 21, delete the word "antilock" between the words "an" and "braking" and insert the word --anti-lock-- in its place.

Signed and Sealed this
Fourteenth Day of June, 2016

Michelle K. Lee
*Director of the United States Patent and Trademark Office*